US012555941B2

(12) United States Patent
Morinaga et al.

(10) Patent No.: US 12,555,941 B2
(45) Date of Patent: Feb. 17, 2026

(54) CONNECTOR

(71) Applicant: SUMITOMO WIRING SYSTEMS, LTD., Mie (JP)

(72) Inventors: Yosuke Morinaga, Mie (JP); Takayuki Uchiyama, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 344 days.

(21) Appl. No.: 18/283,191

(22) PCT Filed: Sep. 27, 2021

(86) PCT No.: PCT/JP2021/035377
§ 371 (c)(1),
(2) Date: Sep. 20, 2023

(87) PCT Pub. No.: WO2022/208940
PCT Pub. Date: Oct. 6, 2022

(65) Prior Publication Data

US 2024/0170875 A1 May 23, 2024

(30) Foreign Application Priority Data

Mar. 31, 2021 (JP) ................................ 2021-061215

(51) Int. Cl.
*H01R 13/187* (2006.01)
*H01R 13/24* (2006.01)

(52) U.S. Cl.
CPC ....... *H01R 13/187* (2013.01); *H01R 13/2492* (2013.01); *H01R 2201/26* (2013.01)

(58) Field of Classification Search
CPC .............. H01R 13/187; H01R 13/2492; H01R 2201/26; H01R 2105/00; H01R 13/6315; H01R 13/2421
See application file for complete search history.

(56) References Cited

U.S. PATENT DOCUMENTS

| | | | |
|---|---|---|---|
| 2018/0316113 A1 | 11/2018 | Nishida et al. | |
| 2018/0316115 A1 | 11/2018 | Kimura et al. | |

(Continued)

FOREIGN PATENT DOCUMENTS

| | | | |
|---|---|---|---|
| JP | 2018-101556 A | 6/2018 | |
| WO | WO-2017073289 A1 * | 5/2017 | .............. H01H 1/24 |
| WO | 2018/116964 A1 | 6/2018 | |

OTHER PUBLICATIONS

International Search Report issued on Nov. 2, 2021 for WO 2022/208940 A1 (6 pages).

*Primary Examiner* — Joseph Ortega
(74) *Attorney, Agent, or Firm* — Venjuris, P.C.

(57) ABSTRACT

A connector 10 includes: a terminal module 14 configured to electrically connect to a partner connector 12; and a connector housing 16 accommodating the terminal module 14. The terminal module 14 includes a case 20, an elastic member 18, a first terminal 22, a second terminal 42, and a flexible conductor 44 electrically connecting the first terminal 22 and the second terminal 42 to each other. The flexible conductor has a first joint portion 52 and a second joint portion 48. The connector housing 16 includes a main body portion 64 and a first lid portion 66. The first lid portion 66 has a bulging portion 102 that bulges toward a side opposite to the flexible conductor 44. The flexible conductor 44 is capable of entering the bulging portion 102 when the connector 10 is fitted together with the partner connector 12.

10 Claims, 11 Drawing Sheets

(56) References Cited

U.S. PATENT DOCUMENTS

| | | | |
|---|---|---|---|
| 2018/0323528 | A1 | 11/2018 | Kimura et al. |
| 2019/0013609 | A1 | 1/2019 | Kimura et al. |
| 2019/0058274 | A1 | 2/2019 | Nishida et al. |
| 2019/0103695 | A1 | 4/2019 | Kimura et al. |
| 2019/0379154 | A1 | 12/2019 | Nishijima |
| 2020/0343665 | A1 | 10/2020 | Kimura et al. |
| 2020/0373697 | A1 | 11/2020 | Nishijima |

* cited by examiner

CONNECTOR

CROSS REFERENCE TO RELATED APPLICATIONS

This application is a national phase of PCT application No. PCT/JP2021/035377, filed on 27 Sep. 2021, which claims priority from Japanese patent application No. 2021-061215, filed on 31 Mar. 2021, all of which are incorporated herein by reference.

TECHNICAL FIELD

The present disclosure relates to a connector.

BACKGROUND

Patent Document 1 discloses a connector including a terminal module having a first terminal (electric contact member), a second terminal (external connection member), and a flexible conductor (braided wire) electrically connecting the first terminal and the second terminal to each other, and a connector housing accommodating the terminal module. Due to the connector fitting together with a partner connector (partner-side connector), the first terminal moves to another side and the first terminal approaches the second terminal. When the connector and the partner connector are fitted together, the flexible conductor bends more compared to when the connector and the partner connector are not fitted together. The connector and the partner connector are, for example, mounted in a vehicle in a fitted-together state.

PRIOR ART DOCUMENT

Patent Document

Patent Document 1: JP 2018-101556 A

SUMMARY OF THE INVENTION

The connector of this disclosure is a connector configured to fit together with a partner connector relatively approaching along a first direction extending from one side to another side, and configured to electrically connect to the partner connector, the connector including: a terminal module configured to electrically connect to the partner connector; and a connector housing accommodating the terminal module, in which the terminal module includes: a case including a ceiling wall and a pair of side walls extending from the ceiling wall to the one side; an elastic member that is accommodated in the case and is elastically deformable along the first direction; a first terminal that is supported by the pair of side walls while being biased toward the one side by the elastic member, and is movable to the other side by being pressed by the partner connector; a second terminal that is arranged on the other side relative to the first terminal and is held in the connector housing; and a flexible conductor electrically connecting the first terminal and the second terminal to each other, the flexible conductor has a first joint portion joined with the first terminal and a second joint portion joined with the second terminal, the connector housing includes: a main body portion configured to hold the terminal module; and a first lid portion configured to be attached to the main body portion and oppose the flexible conductor, the first lid portion has a bulging portion that bulges toward a side opposite to the flexible conductor, and the flexible conductor is capable of entering the bulging portion when the connector is fitted together with the partner connector.

DETAILED DESCRIPTION TO EXECUTE THE INVENTION

Problems to be Solved

Figure 1:
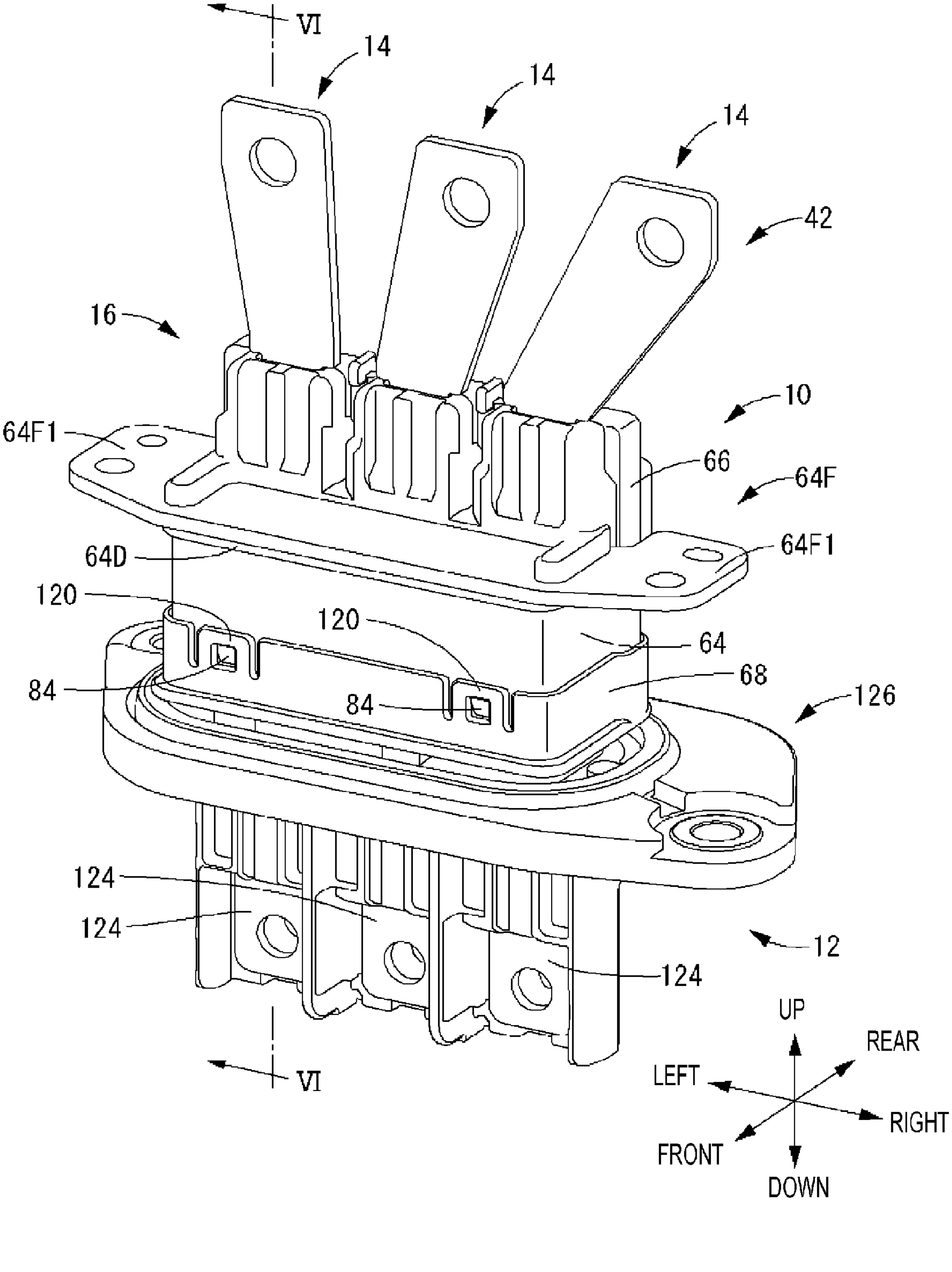
FIG. 1 is a perspective view showing a connector and a partner connector in a fitted-together state according to the present embodiment.

When the connector vibrates due to vibration or the like during traveling of the vehicle, there is a possibility that the flexible conductor will swing and come into contact with the connector housing and the flexible conductor will wear. Thus, the connector has room for further improvement in terms of durability.

An object of the present disclosure is to provide a connector that can improve durability.

Effect of the Invention

According to the connector of the present disclosure, the effect of being able to improve durability is exhibited.

DESCRIPTION OF EMBODIMENTS OF THE PRESENT DISCLOSURE

First, embodiments of the present disclosure will be listed and described.

(1) The connector of this disclosure is a connector configured to fit together with a partner connector relatively approaching along a first direction extending from one side to another side, and configured to electrically connect to the partner connector, the connector including: a terminal module configured to electrically connect to the partner connector; and a connector housing accommodating the terminal module, in which the terminal module includes: a case including a ceiling wall and a pair of side walls extending from the ceiling wall to the one side; an elastic member that is accommodated in the case and is elastically deformable along the first direction; a first terminal that is supported by the pair of side walls while being biased toward the one side by the elastic member, and is movable to the other side by being pressed by the partner connector; a second terminal that is arranged on the other side relative to the first terminal and is held in the connector housing; and a flexible conductor electrically connecting the first terminal and the second terminal to each other, the flexible conductor has a first joint portion joined with the first terminal and a second joint portion joined with the second terminal, the connector housing includes: a main body portion configured to hold the terminal module; and a first lid portion configured to be attached to the main body portion and oppose the flexible conductor, the first lid portion has a bulging portion that bulges toward a side opposite to the flexible conductor, and the flexible conductor is capable of entering the bulging portion when the connector is fitted together with the partner connector.

According to this configuration, the first lid portion opposing the flexible conductor has the bulging portion that bulges toward the side opposite to the flexible conductor. The flexible conductor can enter the bulging portion. Thus, the flexible conductor can be inhibited from wearing due to coming into contact with the first lid portion, compared to the case where the first lid portion is not provided with the bulging portion. Accordingly, the durability of the connector can be improved.

(2) It is preferable that when the connector and the partner connector are not fitted together, the bulging portion is arranged on the other side relative to the first joint portion.

According to this configuration, when the connector and the partner connector are not fitted together, the bulging portion is arranged on the other side relative to the first joint portion. The flexible conductor can swing in the section between the first joint portion, which is a joint portion between the flexible conductor and the first terminal, and the second joint portion, which is a joint portion between the flexible conductor and the second terminal. Due to the partner connector and the connector fitting together, the first terminal moves to the other side. That is, the swinging section of the flexible conductor in the first direction approaches the other side. Thus, the swinging section of the flexible conductor in the first direction is shorter in the fitted-together state than in the non-fitted together state. Accordingly, it is possible to suppress an excessive increase in the size of the connector while suppressing wear of the flexible conductor, compared to the case where the bulging portion overlaps with the first joint portion when viewed from a direction orthogonal to the first direction when the connector and the partner connector are not fitted together. Consequently, it is possible to achieve both an improvement in durability and suppression of an excessive increase in size of the connector.

(3) It is preferable that the bulging portion is arranged on the one side relative to the second joint portion.

According to this configuration, the bulging portion is arranged on the one side relative to the second joint portion. The flexible conductor can swing in the section between the first joint portion, which is a joint portion between the flexible conductor and the first terminal, and the second joint portion, which is a joint portion between the flexible conductor and the second terminal. Furthermore, the first terminal can move to the other side, while the second terminal is held in the connector housing. Thus, it is possible to make the connector more compact while suppressing wear of the flexible conductor, compared to the case where the bulging portion overlaps with the second joint portion when viewed from a direction orthogonal to the first direction. Accordingly, it is possible to achieve both an improvement in durability and suppression of an excessive increase in size of the connector.

(4) It is preferable that the main body portion of the connector housing has an opposing wall opposing the flexible conductor, the opposing wall has a recess recessed toward a side opposite to the flexible conductor, and the flexible conductor is capable of entering the recess when the connector and the partner connector are fitted together.

According to this configuration, the opposing wall opposing the flexible conductor has the recess that is recessed toward the side opposite to the flexible conductor. Furthermore, the flexible conductor can enter the recess. Thus, the flexible conductor can be inhibited from coming into contact with the opposing wall and wearing, compared to the case where the opposing wall is not provided with the recess. Accordingly, the durability of the connector can be improved.

(5) It is preferable that when the connector and the partner connector are not fitted together, the recess is arranged on the other side relative to the first joint portion.

According to this configuration, when the connector and the partner connector are not fitted together, the recess is arranged on the other side relative to the first joint portion. The flexible conductor can swing in the section between the first joint portion, which is a joint portion between the flexible conductor and the first terminal, and the second joint portion, which is a joint portion between the flexible conductor and the second terminal. Due to the partner connector and the connector fitting together, the first terminal moves to the other side. That is, the swinging section of the flexible conductor in the first direction approaches the other side. Thus, the swinging section of the flexible conductor in the first direction is shorter in the fitted-together state than in the non-fitted-together state. Accordingly, when the connector and the partner connector are not fitted together, the connector can be made more compact while suppressing wear of the flexible conductor, compared to the case where the recess overlaps with the first joint portion when viewed from a direction orthogonal to the first direction. Consequently, it is possible to achieve both an improvement in durability and suppression of an excessive increase in size of the connector.

(6) It is preferable that the recess is arranged on the one side relative to the second joint portion.

According to this configuration, the recess is arranged on the one side relative to the second joint portion. The flexible conductor can swing in the section between the first joint portion, which is a joint portion between the flexible conductor and the first terminal, and the second joint portion, which is a joint portion between the flexible conductor and the second terminal. Furthermore, the first terminal can move to the other side, while the second terminal is held in the connector housing. Thus, it is possible to make the connector more compact while suppressing wear of the flexible conductor, compared to the case where the recess overlaps with the second joint portion when viewed from a direction orthogonal to the first direction. Accordingly, it is possible to achieve both an improvement in durability and suppression of an excessive increase in size of the connector.

(7) It is preferable that the recess has a first inclined surface that inclines toward the one side as it approaches the flexible conductor.

According to this configuration, the recess has the first inclined surface that inclines toward the one side as it approaches the flexible conductor. Thus, it is possible to suppress wear of the flexible conductor compared to the case where the first inclined surface is not provided. Accordingly, the durability of the connector can be improved.

(8) It is preferable that the recess has a second inclined surface that inclines toward the other side as it approaches the flexible conductor.

According to this configuration, the recess has the second inclined surface that inclines toward the other side as it approaches the flexible conductor. Thus, it is possible to suppress wear of the flexible conductor compared to the case where the second inclined surface is not provided. Accordingly, the durability of the connector can be improved.

(9) It is preferable that the bulging portion overlaps with the recess when viewed in a direction orthogonal to the first direction and a direction in which the pair of side walls oppose each other.

According to this configuration, the bulging portion overlaps with the recess when viewed from a direction orthogonal to the first direction and the direction in which the pair of side walls oppose each other. Thus, the connector housing has a section in which the flexible conductor can enter both the bulging portion and the recess in the first direction when the flexible conductor swings. Accordingly, the flexible conductor can be inhibited from wearing due to coming into contact with the connector housing. Accordingly, durability of the connector can be further improved.

(10) It is preferable that the flexible conductor is arranged between the bulging portion and the recess when viewed from the direction in which the pair of side walls oppose each other.

According to this configuration, the flexible conductor is arranged between the bulging portion and the recess when viewed from the direction in which the pair of side walls oppose each other. The flexible conductor is sandwiched between the bulging portion and the recess. Thus, even if the flexible conductor swings toward either the bulging portion or the recess, the flexible conductor can be prevented from wearing due to coming into contact with the connector housing. Accordingly, the durability of the connector can be improved.

Details of Embodiment of the Present Disclosure

A specific example of the connector of the present disclosure will be described below with reference to the drawings. In each drawing, part of the configuration may be exaggerated or simplified for convenience of description. Also, the dimensional proportion of each portion may differ in each drawing. Also, in some cases, only some of a plurality of identical members are given reference numerals, and the reference numerals are omitted for the other members. Also, in the present disclosure, "parallel" does not mean parallel in a geometrically strict sense, but is used in a wider sense within a range where the effect of the present invention is exhibited as long as it is regarded as parallel. Also, in the present disclosure, orthogonal does not mean orthogonal in a geometrically strict sense, but is used in a wider sense within a range where the effect of the present invention is exhibited as long as it is considered orthogonal.

<Overview of Connector 10 and Partner Connector 12>

Figure 2:
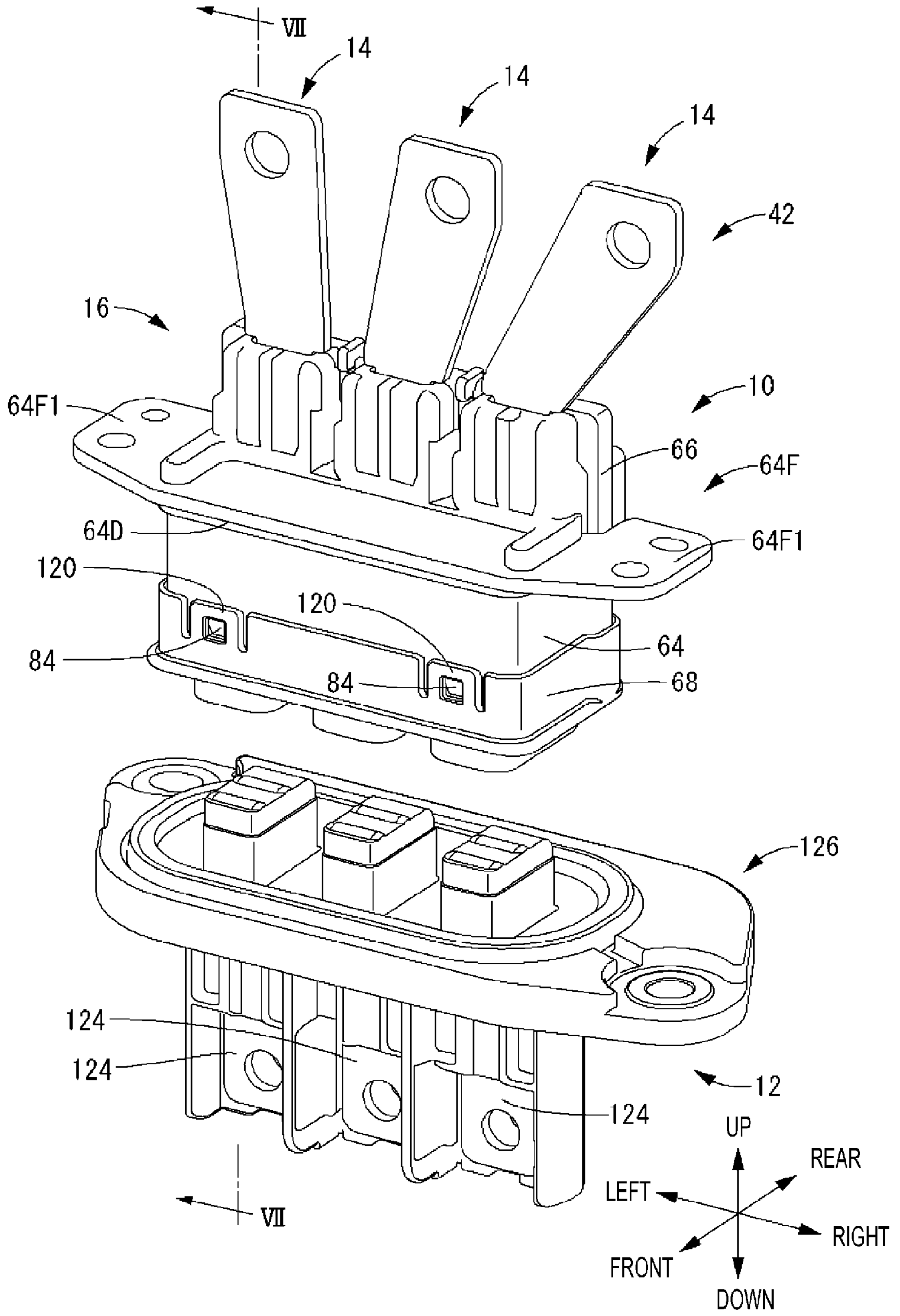
FIG. 2 is a perspective view showing the connector and the partner connector in a non-fitted-together state according to the present embodiment.

As shown in FIGS. 1 and 2, the connector 10 and the partner connector 12 are respectively provided in devices (not shown) mounted in the vehicle. For example, the connector 10 is provided in a PCU (Power Control Unit; an example of a device) including an inverter circuit, and the partner connector 12 is provided in a motor (an example of a partner device).

The partner connector 12 is inserted into the connector 10 due to the partner connector 12 relatively approaching the connector 10 along a first direction extending from one side to another side. That is, the connector 10 and the partner connector 12 are fitted together, and the connector 10 and the partner connector 12 are electrically connected to each other. The PCU and the motor are electrically connected to each other via the connector 10 and the partner connector 12. The fitting between the connector 10 and the partner connector 12 will be described later.

<Connector 10>

The connector 10 includes terminal modules 14 and a connector housing 16. The terminal modules 14 are modules for electrically connecting partner terminals 124 included in the partner connector 12 and electric circuits (not shown) included in the devices to each other.

Figure 3:
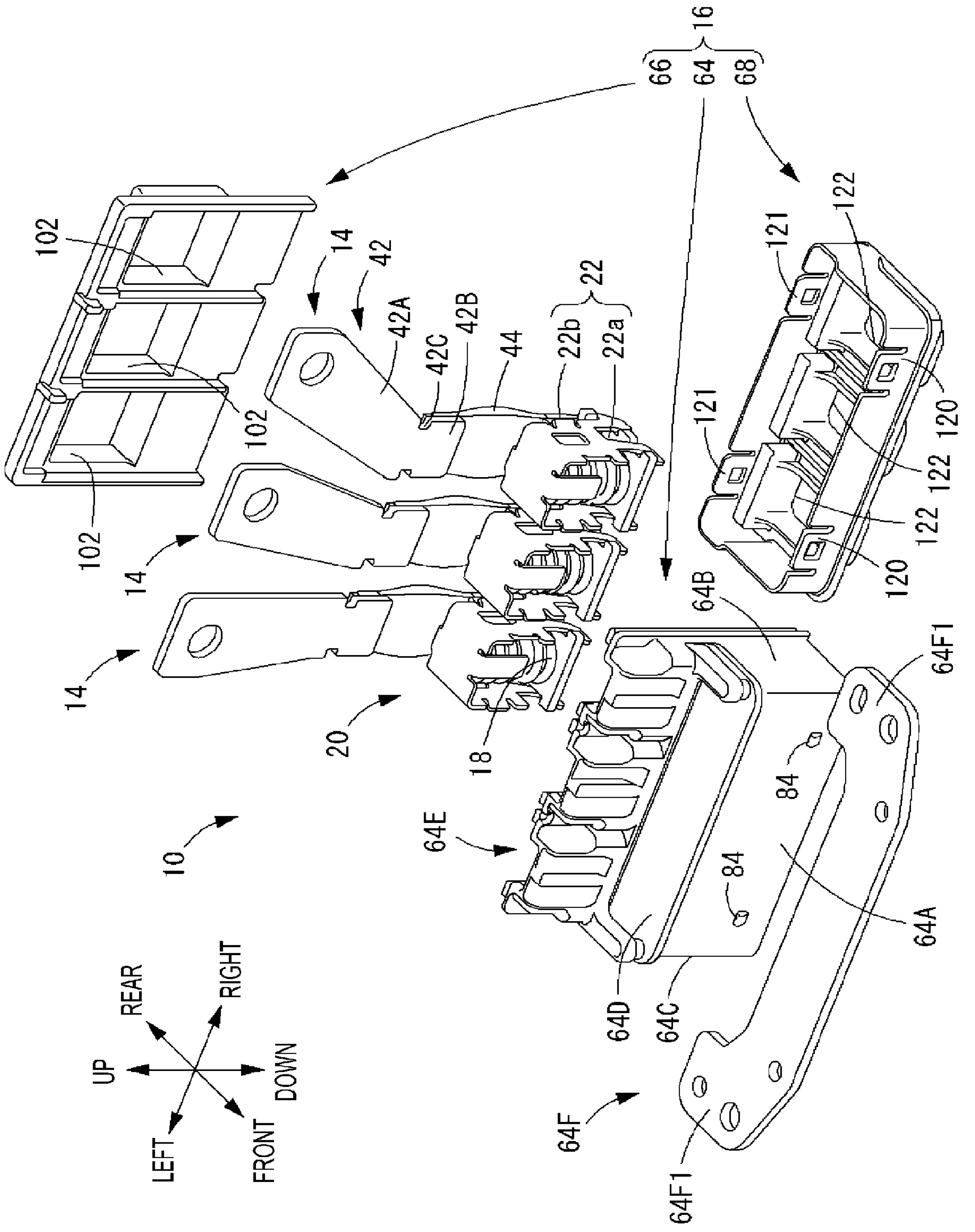
FIG. 3 is an exploded perspective view of the connector shown in FIG. 2.
Figure 4:
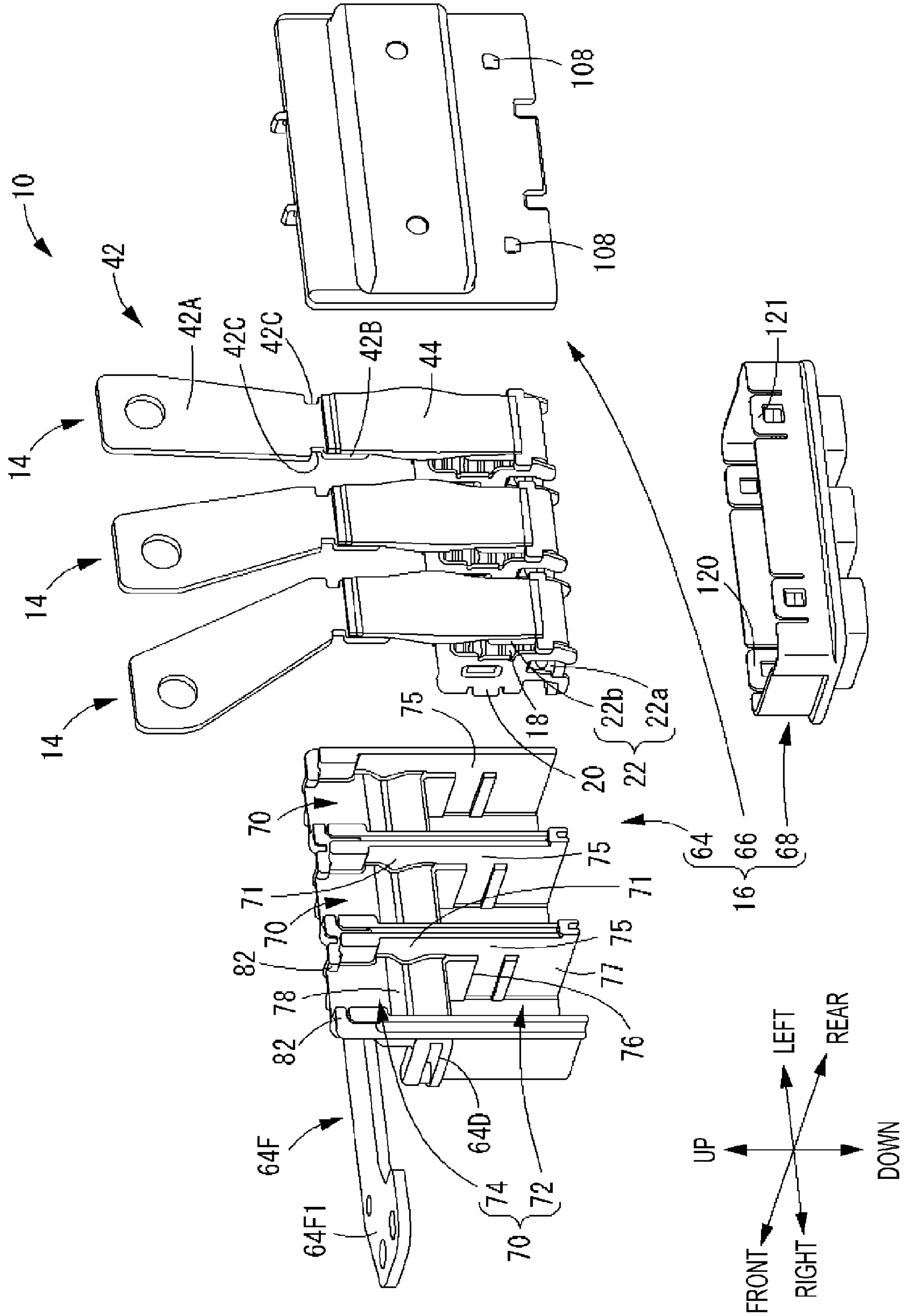
FIG. 4 is an exploded perspective view of the connector shown in FIG. 2, viewed from a direction different from that of FIG. 3.
Figure 7:
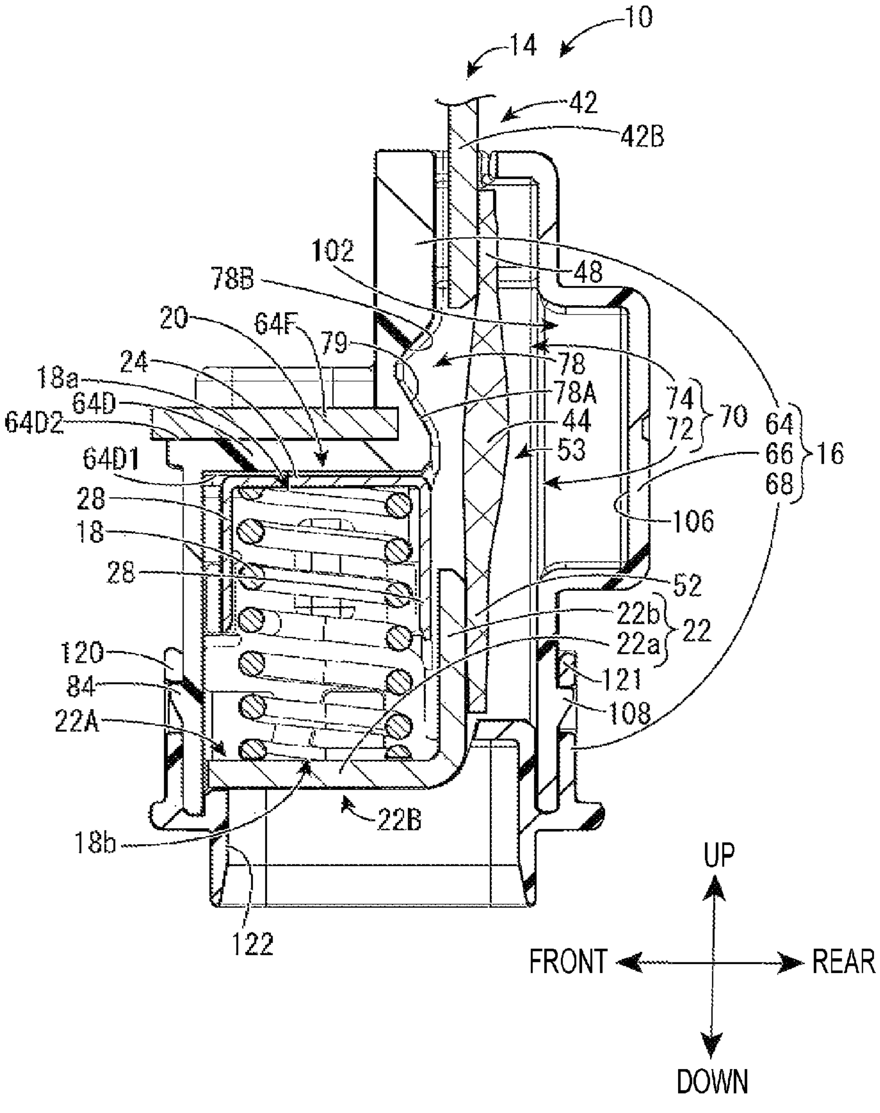
FIG. 7 is an enlarged cross-sectional view of the partner connector cut along a cutting line indicated by arrows VII-VII in FIG. 2.

As shown in FIGS. 3, 4, and 7, the connector housing 16 accommodates the terminal modules 14. The connector housing 16 has a main body portion 64, a first lid portion 66, and a second lid portion 68. The terminal modules 14 are accommodated in a space between the body portion 64, the first lid portion 66, and the second lid portion 68. The terminal modules 14, the body portion 64, and the first lid portion 66 are arranged side by side in a direction perpendicular to the first direction. The body portion 64 and the second lid portion 68 are arranged side by side along the first direction.

<Terminal Module 14>

Figure 8:
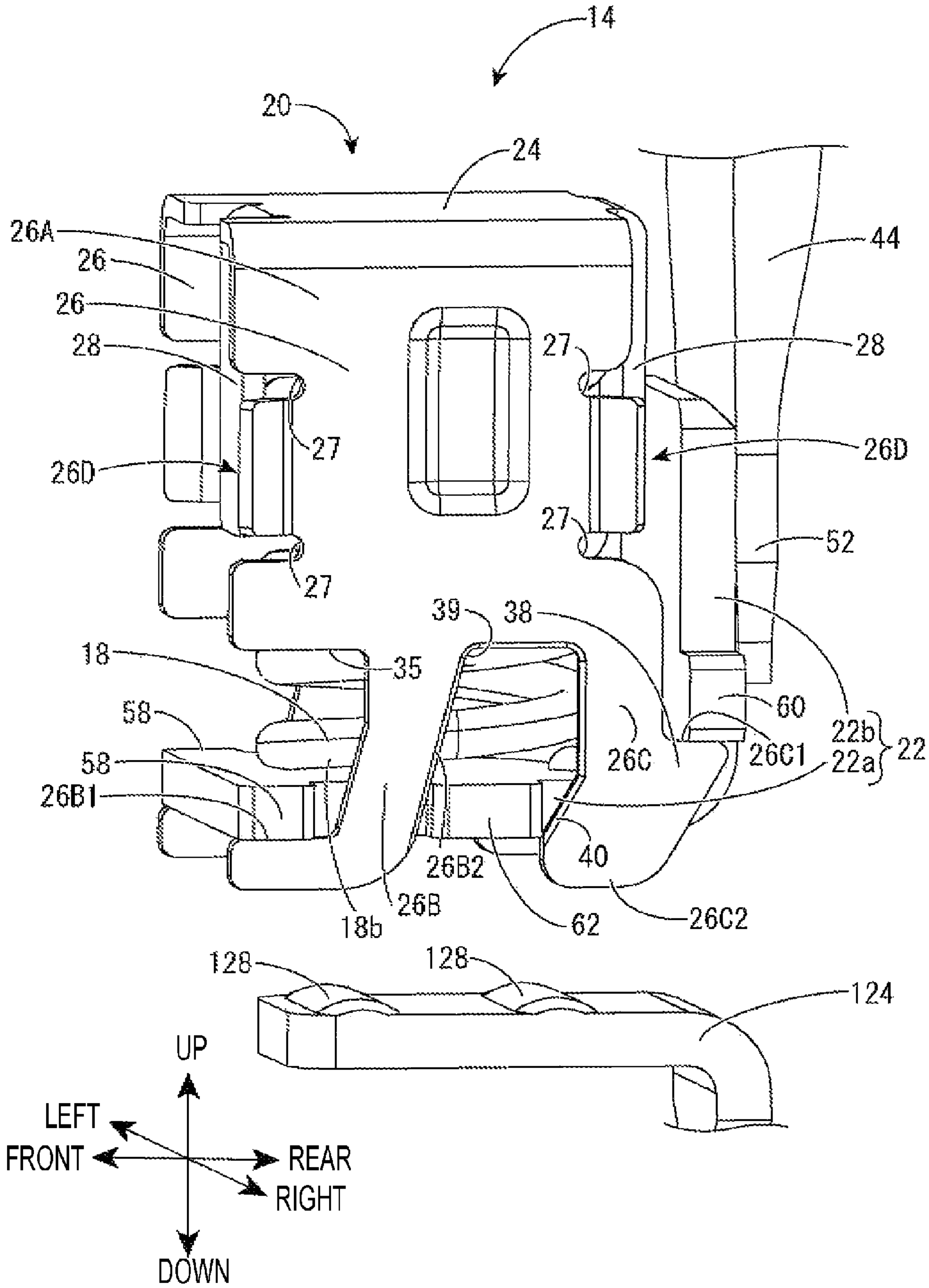
FIG. 8 is a perspective view showing a state before connection between the terminal module of the connector and a partner terminal of the partner connector according to the present embodiment.
Figure 9:
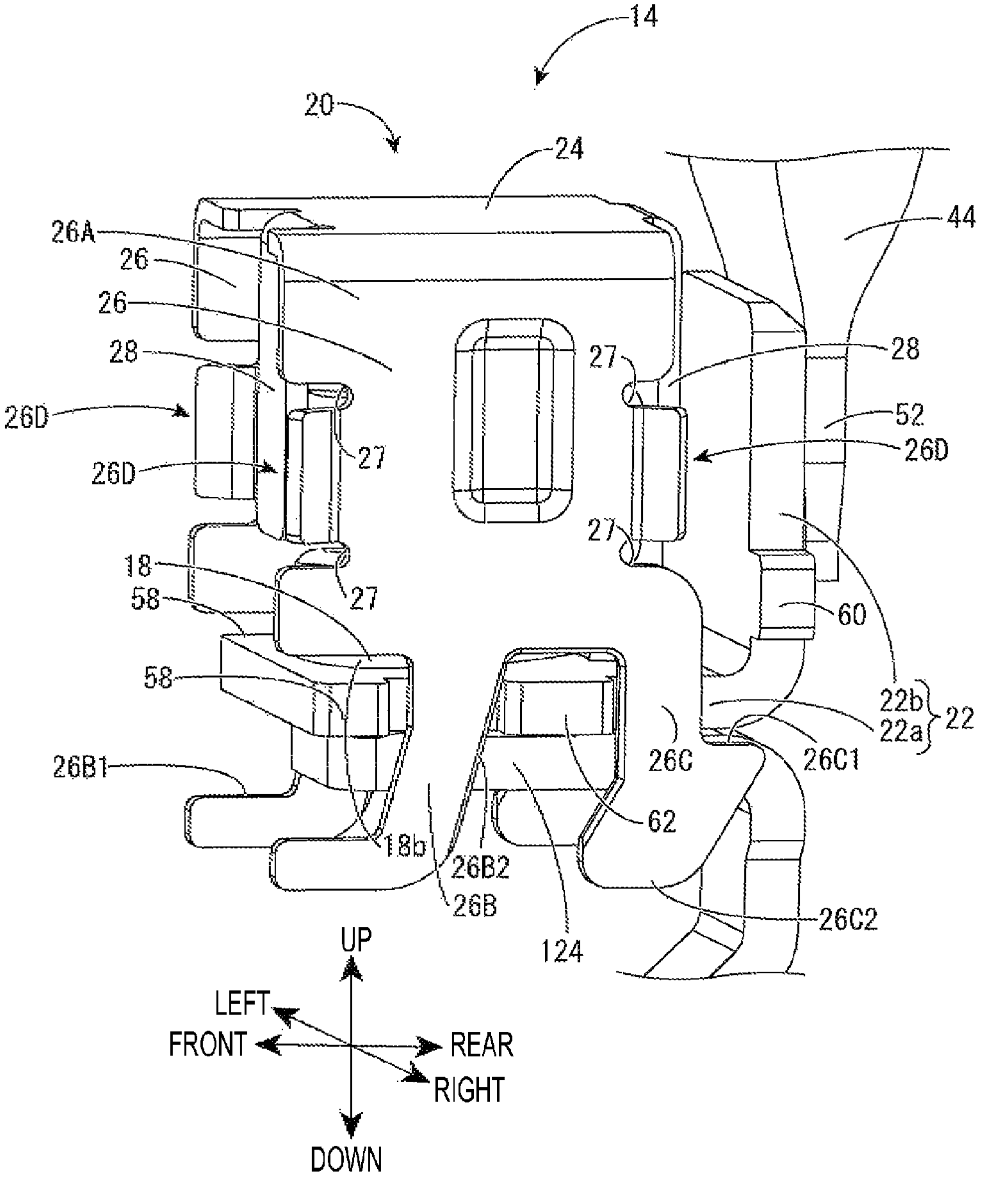
FIG. 9 is a perspective view showing a state of connection between the terminal module of the connector and the partner terminal of the partner connector according to the present embodiment.

As shown in FIGS. 7, 8, and 9, the terminal module 14 includes a case 20, an elastic member 18, a first terminal 22, a second terminal 42, and a flexible conductor 44. The configuration of each part of the terminal module 14 described below is a configuration of the connector 10 in a non-fitted-together state.

<Case 20>

As shown in FIG. 8, the case 20 has a ceiling wall 24, a pair of side walls 26, 26 extending from the ceiling wall 24, and a pair of elastic member holding walls 28, 28 extending from the ceiling wall 24. The case 20 is made of a metal, for example. The case 20 is made of stainless steel, for example. The case 20 accommodates the elastic member 18. In the case 20, for example, the ceiling wall 24, the pair of side walls 26, 26, and the pair of elastic member holding walls 28, 28 are formed in one piece by pressing a plate material.

The pair of side walls 26, 26 oppose each other. The direction in which the pair of side walls 26, 26 oppose each other is perpendicular to the first direction. The direction in which the pair of side walls 26, 26 oppose each other is perpendicular to the direction in which the main body portion 64 and the first lid portion 66 are arranged side by side.

In the following description, for convenience, the direction along the first direction will be referred to as the up-down direction. The direction in which the pair of side walls 26, 26 oppose each other will be referred to as the left-right direction. A direction orthogonal to the first direction and the direction in which the pair of side walls 26, 26 oppose each other will be referred to as the front-rear direction. That is, the direction in which the main body portion 64 and the first lid portion 66 are arranged side by side will be referred to as the front-rear direction. In the following description, for the sake of convenience, in the up-down direction, the other side will be referred to as upward, and the one side will be referred to as downward. In the front-rear direction, the body portion 64 side will be referred to as frontward, and the first lid portion 66 side will be referred to as rearward.

The ceiling wall 24 is a flat plate-shaped region provided along the front-rear direction and the left-right direction. The widths of the ceiling wall 24 in the front-rear direction and the left-right direction are greater than the widths of the elastic member 18 in the front-rear direction and the left-right direction. The ceiling wall 24 covers the elastic member 18 when viewed from above in the vertical direction.

The pair of side walls 26, 26 are a pair of walls that are parallel to each other and extend downward from the edges in the left-right direction of the ceiling wall 24. The pair of side walls 26, 26 have shapes that are mirror-symmetrical to each other. The right side wall 26 will be representatively described below. As shown in FIG. 8, the side walls 26 each have a base portion 26A, a first leg portion 26B, a second leg portion 26C, and guide projections 26D.

The base portion 26A is continuous with the ceiling wall 24. The base portion 26A has the same width as the ceiling wall 24 in the front-rear direction. The base portion 26A has a function of receiving the elastic member 18 that bends in the left-right direction when the elastic member 18 is compressed or stretched.

The first leg portion 26B extends downward from the base portion 26A at the central portion of the base portion 26A in the front-rear direction, and is inclined frontward. The width of the first leg portion 26B in the vertical direction is longer than the inclination width of the first leg portion 26B in the front-rear direction. The first leg portion 26B has a smaller width than the base portion 26A in the front-rear direction. The first leg portion 26B has, for example, a width about one-fourth that of the base portion 26A. The first leg portion 26B has a first receiving portion 26B1 extending frontward at its lower end portion. The upper surface of the first receiving portion 26B1 is a surface extending along the front-rear direction. A rear surface of the first leg portion 26B functions as a guide surface 26B2 that guides the first terminal 22 when the partner connector 12 is fitted. Since the guide surface 26B2 extends downward while being inclined in the front-rear direction, the first terminal 22 is guided in the up-down direction as well as in the front-rear direction along the guide surface 26B2.

The second leg 26C extends downward from the base portion 26A. The second leg portion 26C is positioned rearward of the first leg portion 26B. The second leg portion 26C is spaced apart from the first leg portion 26B in the front-rear direction. The second leg portion 26C has a smaller width than the base portion 26A in the front-rear direction. The second leg portion 26C has, for example, a width about one-fourth that of the base portion 26A. The second leg portion 26C has a second receiving portion 26C1 and a lower end portion 26C2. The second receiving portion 26C1 is arranged above the lower end portion 26C2. The second receiving portion 26C1 protrudes rearward relative to the lower end portion 26C2. The upper surface of the second receiving portion 26C1 is a surface extending along the front-rear direction.

The guide projections 26D protrude rightward from the base portion 26A. The guide projections 26D protrude from the base portion 26A toward the side opposite to the elastic member 18. The guide projections 26D are formed by bending portions of the side wall 26 rightward. For example, the guide projections 26D are each formed by bending the side wall 26 rightward between a pair of slits 27, 27, and since the slits 27, 27 are provided on both the upper and lower sides of the guide projection 26D, the guide projection 26D is easily bent rightward.

The guide projections 26D are arranged above the first leg portion 26B. The guide projections 26D are arranged above the second leg portion 26C. One guide projection 26D is provided frontward of the side wall 26 and one guide projection 26D is provided rearward of the side wall 26. The guide projection 26D arranged frontward of the side wall 26 and the guide projection 26D arranged rearward of the side wall 26 overlap each other when viewed from the front-rear direction. The position of the upper surface of the guide projection 26D arranged frontward of the side wall 26 is equal to the position of the upper surface of the guide projection 26D arranged rearward of the side wall 26. The position of the lower surface of the guide projection 26D arranged frontward of the side wall 26 is equal to the position of the lower surface of the guide projection 26D arranged rearward of the side wall 26.

The pair of elastic member holding walls 28, 28 are a pair of walls that are parallel to each other and extend downward from the edges in the front-rear direction of the ceiling wall 24. The pair of elastic member holding walls 28, 28 have a width smaller than that of the ceiling wall 24 in the left-right direction. The pair of elastic member holding walls 28, 28 have, for example, a width about one-third of the width of the ceiling wall 24 in the left-right direction. The pair of elastic member holding walls 28, 28 have a smaller width than the side wall 26 in the up-down direction. The pair of elastic member holding walls 28, 28 have, for example, a width about half that of the side wall 26 in the vertical direction. As shown in FIG. 7, the inner surfaces of the pair of elastic member holding walls 28, 28 in the front-rear direction oppose the side portions in the front-rear direction of the elastic member 18 with slight gaps therebetween. The pair of elastic member holding walls 28, 28 have the function of receiving the elastic member 18 that bends in the front-rear direction when the elastic member 18 is compressed or stretched.

<Elastic Member 18>

The elastic member 18 is a coil spring formed by winding a wire made of a metal into a coil shape. The elastic member 18 is made of stainless steel, for example.

As shown in FIG. 8, the elastic member 18 is accommodated in the case 20. That is, the elastic member 18 is surrounded by the ceiling wall 24, the pair of side walls 26, 26, and the pair of elastic member holding walls 28, 28. The elastic member 18 is sandwiched between the ceiling wall 24 and the first terminal 22 while being compressed in the up-down direction. The elastic member 18 biases the first terminal 22 downward. The elastic member 18 biases the ceiling wall 24 upward. In this state, the elastic member 18 can be further compressed in the up-down direction. That is, the elastic member 18 is compressed by the ceiling wall 24 and the first terminal 22 in a range shorter than the free length of the spring and longer than the length of the spring during maximum compression.

The elastic member 18 has a first end portion 18*a* and a second end portion 18*b*. The first end portion 18*a* is a region of approximately one turn from the upper end of the elastic member 18. The first end 18*a* is in contact with the ceiling wall 24. The second end portion 18*b* is a region of about one turn from the lower end of the elastic member 18. The second end portion 18*b* is in contact with the first terminal 22.

<First Terminal 22>

Figure 6:
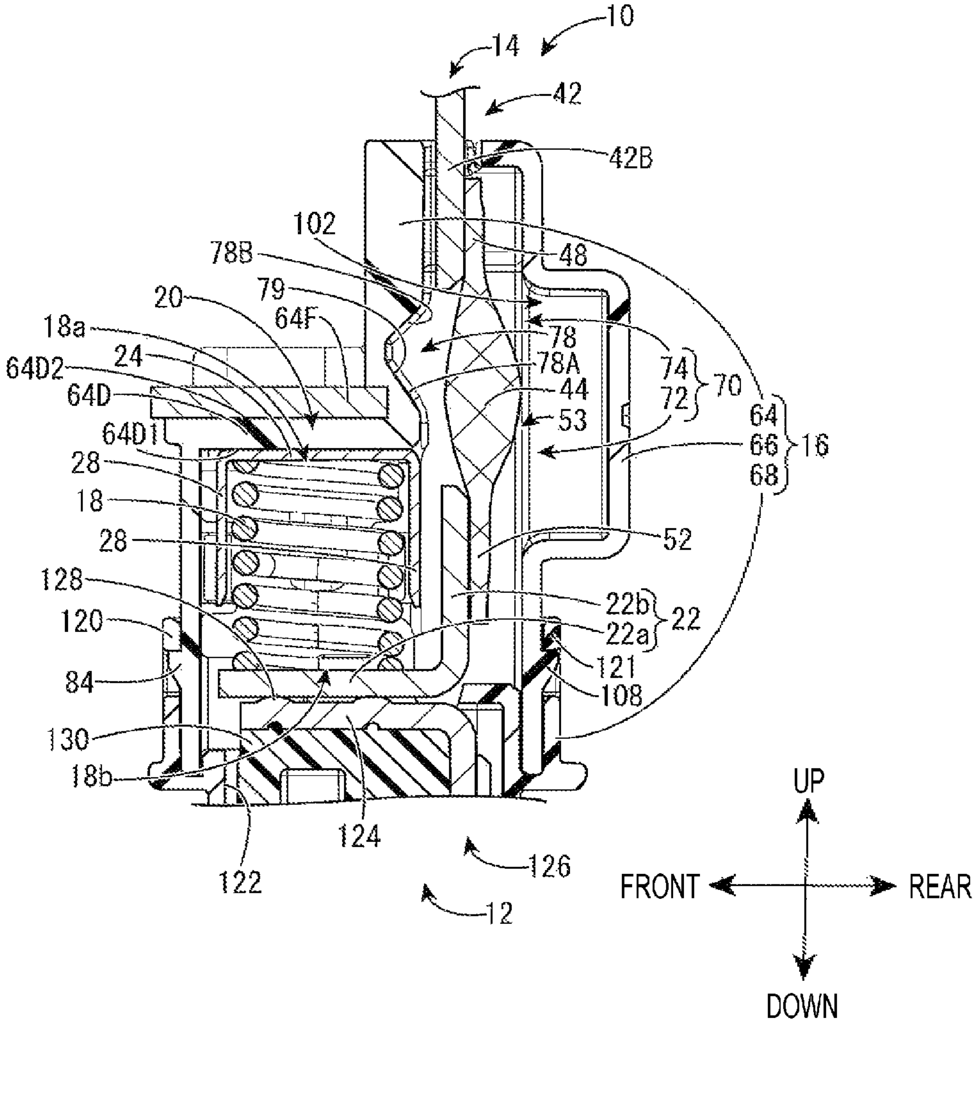
FIG. 6 is an enlarged cross-sectional view of the connector cut along a cutting line indicated by arrows VI-VI in FIG. 1.

As shown in FIGS. 6, 7, and 8, the first terminal 22 is a terminal capable of physically coming into contact with the partner terminal 124. As shown in FIGS. 7 and 8, the first terminal 22 is attached to the pair of side walls 26, 26. The first terminal 22 is supported by the pair of side walls 26, 26 while being biased downward by the elastic member 18. The first terminal 22 has a first portion 22*a*, a second portion 22*b*, a first surface 22A, and a second surface 22B arranged on the side opposite to the first surface 22A. The first terminal 22 is made of a metal. The first terminal 22 is made of a copper alloy, for example. In the first terminal 22, the first portion 22*a* and the second portion 22*b* are formed in one piece by pressing a plate material.

The first portion 22*a* is arranged spaced apart downward from the ceiling wall 24. The first portion 22*a* is provided parallel to the ceiling wall 24. That is, the first portion 22*a* extends along the front-rear direction and the left-right direction. The second portion 22*b* extends upward from the rearward edge of the first portion 22*a*. Thus, the first terminal 22 has an L shape when viewed from the left-right direction. The first portion 22*a* has a pair of first engaging portions 58, 58 and a pair of guided portions 62, 62. The second portion 22*b* has a pair of second engaging portions 60, 60.

The first surface 22A of the first portion 22*a* is in contact with the second end 18*b* of the elastic member 18. The first surface 22A of the first portion 22*a* functions as a receiving surface for receiving the second end portion 18*b* of the elastic member 18. The second surface 22B of the first portion 22*a* functions as a contact surface capable of coming into contact with a partner contact 128 included in the partner terminal 124.

The first engaging portion 58 protrudes outward in the left-right direction at the front edge of the first portion 22*a*. The first engaging portion 58 comes into contact with the first receiving portion 26B1 of the first leg portion 26B from above. The first engaging portion 58 comes into contact with the upper surface of the first receiving portion 26B1. The first engaging portion 58 is received by the first receiving portion 26B 1.

The guided portion 62 protrudes outward in the left-right direction at the central portion in the front-rear direction of the first portion 22*a*. The guided portion 62 is inserted between the first leg portion 26B and the second leg portion 26C. When the connector 10 is fitted together with the partner connector 12, the guided portion 62 is guided in the vertical direction as well as in the front-rear direction along the guide surface 26B2.

The first surface 22A of the second portion 22*b* is a surface facing toward the elastic member 18. The second surface 22B of the second portion 22*b* is a surface facing away from the elastic member 18. The flexible conductor 44 is connected to the second surface 22B of the second portion 22*b*.

The second engaging portion 60 protrudes outward in the left-right direction. The second engaging portion 60 is arranged below the central portion in the up-down direction of the second portion 22*b*. The second engaging portion 60 comes into contact with the second receiving portion 26C1 of the second leg portion 26C from above. The second engaging portion 60 comes into contact with the upper surface of the second receiving portion 26C1. The second engaging portion 60 is received by the second receiving portion 26C1.

Downward movement of the first terminal 22 is restricted due to the first engaging portion 58 coming into contact with the first receiving portion 26B1 and the second engaging portion 60 coming into contact with the second receiving portion 26C1. That is, the first terminal 22 is sandwiched between the elastic member 18 and the pair of side walls 26, 26 in the non-fitted-together state. In the non-fitted-together state, the first terminal 22 is sandwiched between the elastic member 18, the pair of first receiving portions 26B1, 26B1, and the pair of second receiving portions 26C1, 26C1.

<Second Terminals 42>

As shown in FIGS. 4 and 7, the second terminals 42 are flat plate-shaped terminals electrically connected to electrical circuits (not shown) included in the PCU. The second terminals 42 each have an upper portion 42A, a lower portion 42B, and a constricted portion 42C. The second terminals 42 are made of a metal. The second terminals 42 are made of a copper alloy, for example. In each of the second terminals 42, the upper portion 42A, the lower portion 42B, and the constricted portion 42C are formed in one piece by pressing a plate material. The second terminals 42 are attached to the connector housing 16. The second terminals 42 are held at a position above the first terminals 22 by the connector housing 16.

The upper portion 42A is arranged outside of the connector housing 16. The upper portion 42A is a region connected to an electrical circuit (not shown). The lower portion 42B extends downward from the upper portion 42A. The lower portion 42B is located inside the connector housing 16. The flexible conductor 44 is connected to the lower portion 42B. The constricted portion 42C is a region recessed inward in the left-right direction at the boundary region between the upper portion 42A and the lower portion 42B. The constricted portion 42C fits together with the connector housing 16 through recess-protrusion fitting.

<Flexible Conductor 44>

The flexible conductor 44 is a conductor that has flexibility. As shown in FIG. 7, the flexible conductor 44 electrically connects the first terminal 22 and the second terminal 42 to each other. The flexible conductor 44 is a conductor that is more flexible than the first terminal 22. The flexible conductor 44 is a conductor that is more flexible than the second terminal 42. The flexible conductor 44 can be repeatedly deformed.

The flexible conductor 44 is, for example, a band-shaped braided wire obtained by braiding a plurality of conductive metal strand wires together. The braided wire is formed, for example, by braiding strand wires made of a copper alloy together. The flexible conductor 44 has a first joint portion 52 joined to the first terminal 22, a second joint portion 48 joined to the second terminal 42, and an intermediate joint portion 53 between the first joint portion 52 and the second joint portion 48.

The first joint portion 52 is joined to the first terminal 22 through resistance welding. The first joint portion 52 is joined to the second portion 22*b* of the first terminal 22 through resistance welding, for example. The first joint portion 52 has higher rigidity than the intermediate portion 53. The second joint portion 48 is joined to the second terminal 42 through resistance welding. The second joint portion 48 is joined to the lower portion 42B of the second terminal 42 through resistance welding, for example. The second joint portion 48 has higher rigidity than the intermediate portion 53.

The second portion 22*b* of the first terminal 22 and the second terminal 42 are arranged side by side in the up-down direction. That is, the first joint portion 52 and the second joint portion 48 are arranged side by side in the up-down direction. Among the first joint portion 52, the second joint portion 48, and the intermediate portion 53, the first joint portion 52 is arranged at the lowest position. Among the first joint portion 52, the second joint portion 48, and the intermediate portion 53, the second joint portion 48 is arranged at the uppermost position.

<Connector Housing 16>

As shown in FIGS. 3, 4, and 7, the connector housing 16 has the main body portion 64, the first lid portion 66, and the second lid portion 68. The connector housing 16 accommodates the terminal modules 14. The connector housing 16 accommodates three terminal modules 14 in this embodiment. A reinforcing member 64F is attached to the main body portion 64. The first lid portion 66 is attached to the rear of the main body portion 64. The second lid portion 68 is attached below the main body portion 64 and the first lid portion 66.

<Main Body Portion 64>

The main body portion 64 is made of a thermoplastic resin, for example. The main body portion 64 has a front wall 64A, a right wall 64B, a left wall 64C, a support wall 64D, and an upper wall 64E. The front wall 64A, the right wall 64B, the left wall 64C, the support wall 64D, and the upper wall 64E are formed in one piece through injection molding, for example.

The front wall 64A is a wall arranged in front of the cases 20. The right wall 64B is a wall extending rearward from the right edge of the front wall 64A. The left wall 64C is a wall extending rearward from the left edge of the front wall 64A. The support wall 64D is a wall arranged above the cases 20. The support wall 64D is continuous with the front wall 64A, the right wall 64B, and the left wall 64C. The upper wall 64E is a wall that extends upward from the rear edge of the support wall 64D.

The support wall 64D is arranged above the ceiling walls 24 of the cases 20. The support wall 64D has a contact surface 64D1 and a reinforcing surface 64D2 arranged on the side opposite to the contact surface 64D1.

The contact surface 64D1 opposes the cases 20. The contact surface 64D1 opposes the ceiling walls 24. The contact surface 64D1 can come into contact with the cases 20. The contact surface 64D1 can come into contact with the ceiling walls 24.

Figure 10:
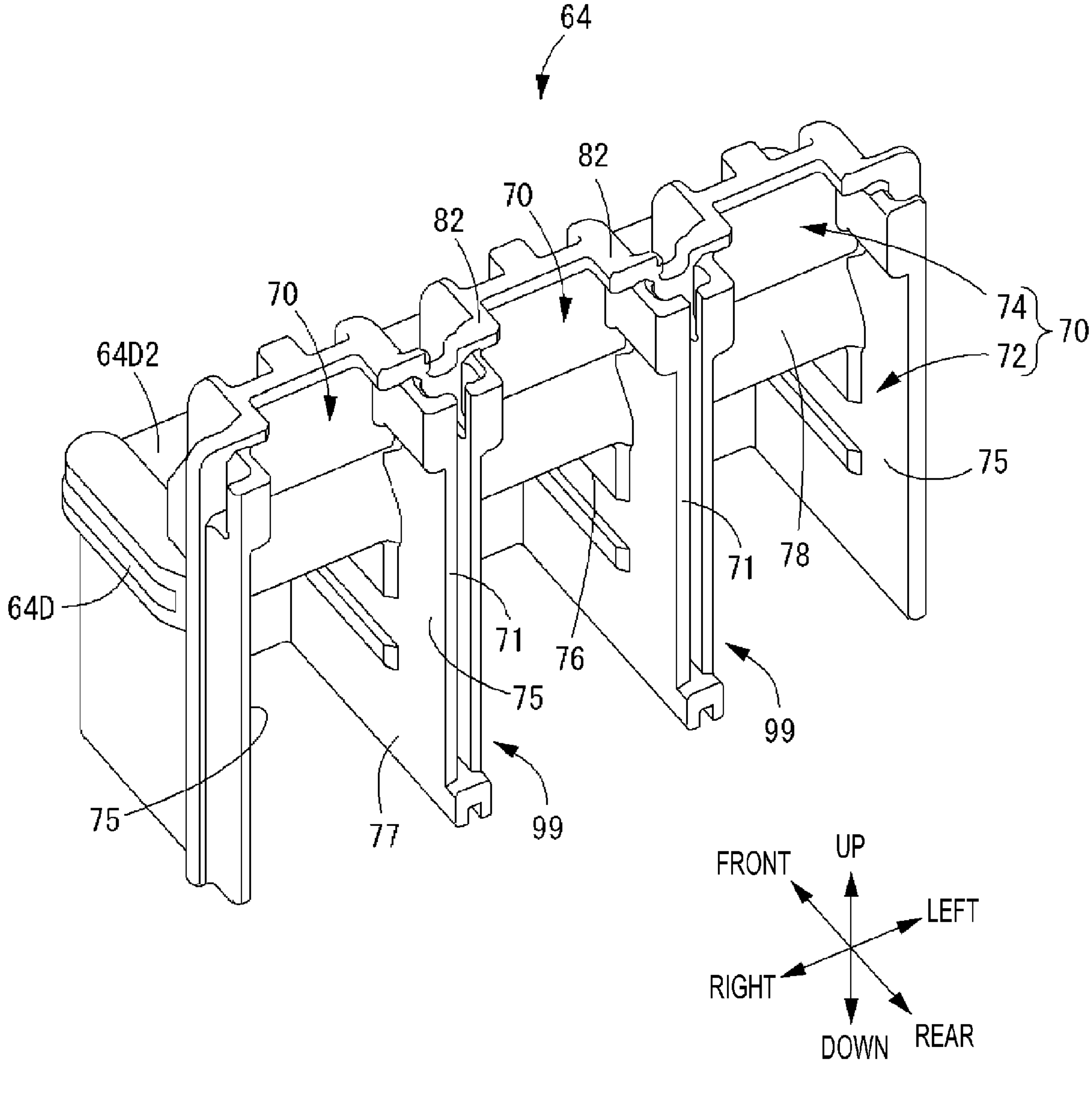
FIG. 10 is a perspective view of a main body portion of the connector shown in FIG. 3.

As shown in FIGS. 3, 4, and 10, the main body portion 64 includes terminal module accommodation portions 70 for accommodating the terminal modules 14, partition walls 71, first opening portions 75, second opening portions 77, holding portions 82, and first engaging projections 84.

The first opening portions 75 are formed due to the rear of the main body 64 being open. The first openings 75 expose the terminal module accommodating portions 70 to the outside of the main body portion 64. Thus, the main body portion 64 can store the terminal modules 14 in the terminal module accommodating portions 70 from the rear, for example.

The second opening portions 77 are formed due to the lower portion of the body portion 64 being open. The second opening portions 77 expose the terminal module accommodating portions 70 to the outside of the main body portion 64.

The terminal module accommodating portions 70 each have a case accommodating portion 72 and a flexible conductor accommodating portion 74. The terminal module accommodating portions 70 each extend along the up-down direction. The terminal module accommodating portions 70 are the internal space of the main body portion 64. A plurality of terminal module accommodating portions 70 are provided along the left-right direction. The plurality of terminal module accommodating portions 70 are formed by partitioning the internal space of the main body portion 64 with the partition walls 71. The plurality of terminal module accommodating portions 70 individually accommodate the plurality of terminal modules 14. In this embodiment, the three terminal module accommodating portions 70 are arranged side by side in the left-right direction.

The partition walls 71 extend in the up-down direction and the front-rear direction. The partition walls 71 are continuous with the front wall 64A, the support wall 64D, and the upper wall 64E. The partition walls 71 define spaces for individually accommodating the plurality of terminal modules 14 in the main body portion 64. That is, the partition walls 71 are arranged between adjacent terminal module accommodating portions 70. In this embodiment, two partition walls 71 are provided to form three terminal module accommodating portions 70. That is, in this embodiment, two partition walls 71 are arranged side by side in the left-right direction.

The partition walls 71 are arranged between the case accommodating portions 72 adjacent to each other in the left-right direction. That is, the partition walls 71 are arranged between the cases 20 adjacent to each other in the left-right direction. The partition walls 71 oppose the cases 20 in the left-right direction. The partition walls 71 are arranged between the flexible conductor accommodating portions 74 adjacent to each other in the left-right direction. That is, the partition walls 71 are arranged between the flexible conductors 44 adjacent to each other in the left-right direction. The partition walls 71 oppose the flexible conductors 44 in the left-right direction.

The partition walls 71 each have a guide rail 99 extending in the up-down direction. The guide rails 99 are, for example, grooves extending in the up-down direction. The guide rails 99 are provided on the rear surfaces of the partition walls 71. The rear surfaces of the partition walls 71 oppose the first lid portion 66. The guide rails 99 oppose the first lid portion 66.

The case accommodating portions 72 accommodate the cases 20 of the terminal modules 14. The case accommodating portions 72 are arranged below the flexible conductor accommodating portions 74. The case accommodating portions 72 oppose the cases 20. The rear sides of the case accommodating portions 72 are open by the first opening portions 75. The lower sides of the case accommodating portions 72 are open by the second opening portions 77.

In this embodiment, three case accommodating portions 72 are arranged side by side in the left-right direction. The case accommodating portion 72 located on the rightmost side is defined by the front wall 64A, the right wall 64B, the support wall 64D, and the partition wall 71. The case accommodating portion 72 located on the leftmost side is partitioned by the front wall 64A, the left wall 64C, the support wall 64D, and the partition wall 71. The case accommodating portion 72 in the middle in the left-right direction is defined by the front wall 64A, the support wall 64D, and the pair of partition walls 71, 71.

The case accommodating portions 72 have guide grooves 76 that restrict the moving directions of the terminal modules 14. The guide grooves 76 are provided in the right wall 64B, the left wall 64C, and the partition walls 71. The guide grooves 76 extend along the front-rear direction. The guide grooves 76 oppose the cases 20. The guide grooves 76 oppose the pair of side walls 26, 26. The guide projections 26D of the cases 20 are inserted into the guide grooves 76, and the guide grooves 76 hold the guide projections 26D. The guide projections 26D are locked in the guide grooves 76. The guide projections 26D provided on the pairs of side walls 26, 26 are slidable in guide grooves 76. Accordingly, the terminal modules 14 are slidable along the guide grooves 76.

The flexible conductor accommodating portions 74 accommodate the flexible conductors 44 of the terminal modules 14. The flexible conductor accommodating portions 74 are arranged above the case accommodating portions 72. The flexible conductor accommodating portions 74 are continuous with the case accommodating portions 72. The flexible conductor accommodating portions 74 are arranged on the upper wall 64E. The flexible conductor accommodating portions 74 oppose the flexible conductors 44. The rear sides of the flexible conductor accommodating portions 74 are open by the first opening portions 75. The flexible conductor accommodating portions 74 each have an opposing wall 79 opposing the flexible conductor 44 and a recess 78 formed in the opposing wall 79.

As shown in FIG. 7, the recess 78 opposes the flexible conductor 44. The recess 78 is recessed toward the side opposite to the flexible conductor 44. The flexible conductor 44 can enter the internal space of the recess 78. The recess 78 is arranged above the first joint portion 52. That is, the recess 78 is arranged on the other side relative to the first joint portion 52. The recess 78 is arranged below the second joint portion 48. That is, the recess 78 is arranged on the one side relative to the second joint portion 48.

The recess 78 has a first inclined surface 78A and a second inclined surface 78B. The first inclined surface 78A is inclined downward toward the rear. That is, the first inclined surface 78A is inclined toward the one side as the flexible conductor 44 is approached. The second inclined surface 78B is inclined upward toward the rear. That is, the second inclined surface 78B is inclined toward the other side as the flexible conductor 44 is approached. The second inclined surface 78B is arranged above the first inclined surface 78A.

The holding portions 82 hold the second terminals 42 such that the second terminals 42 are arranged above the first terminals 22. The holding portions 82 are fitted together with the constricted portions 42C of the second terminals 42 through recess-protrusion fitting. The holding portions 82 are arranged on the upper wall 64E. The holding portions 82 are arranged above the case accommodating portions 72. The holding portions 82 are arranged above the flexible conductor accommodating portions 74.

The first engaging projections 84 are engaged with the second lid portion 68. The first engaging projections 84 are provided on the front wall 64A of the main body portion 64. The first engaging projections 84 are arranged on the lower side of the front wall 64A. In this embodiment, a plurality of first engaging projections 84 are provided.

<Reinforcing Member 64F>

As shown in FIGS. 3, 4, and 7, the reinforcing member 64F is a plate-shaped member extending in the left-right direction. The reinforcing member 64F is made of stainless steel, for example. The reinforcing member 64F has higher rigidity than the connector housing 16. The reinforcing member 64F has higher rigidity than the support wall 64D.

The reinforcing member 64F is attached to the connector housing 16. The reinforcing member 64F is attached to the main body portion 64. The reinforcing member 64F is attached to the support wall 64D. The reinforcing member 64F is in contact with the reinforcing surface 64D2 of the support wall 64D.

The reinforcing member 64F is integrated with the connector housing 16. At least part of the reinforcing member 64F is embedded in the connector housing 16. The reinforcing member 64F is integrated with the connector housing 16 through insert molding, for example. The reinforcing member 64F is integrated with the body portion 64. The reinforcing member 64F is integrated with the main body portion 64. At least part of the reinforcing member 64F is embedded in the main body portion 64. The reinforcing member 64F is integrated with the support wall 64D through insert molding, for example.

The reinforcing member 64F overlaps with the support wall 64D when viewed from above in the up-down direction. The reinforcing member 64F overlaps with the contact surface 64D1 when viewed from above in the up-down direction. The reinforcing member 64F overlaps with the ceiling walls 24 of the cases 20 of the terminal modules 14 when viewed from above in the up-down direction. In this embodiment, the reinforcing member 64F overlaps with all of the ceiling walls 24 of the three terminal modules 14 arranged side by side in the left-right direction when viewed from above in the up-down direction.

The reinforcing member 64F has fixing portions 64F1 capable of fixing the connector 10 to the housing of the PCU. The fixing portions 64F1 are respectively provided on both sides in the left-right direction of the reinforcing member 64F.

<First Lid Portion 66>

As shown in FIGS. 2, 3, 4, and 7, the first lid portion 66 is attached to the main body portion 64. The first lid portion 66 covers the first opening portions 75 of the main body portion 64. The first lid portion 66 opposes the flexible conductors 44. The first lid portion 66 is slidable with respect to the main body portion 64. More specifically, the first lid portion 66 is slidable along the up-down direction with respect to the main body portion 64. The first lid portion 66 has bulging portions 102, second engaging projections 108, and guide protruding pieces 117.

As shown in FIG. 7, the bulging portions 102 oppose the flexible conductors 44. The bulging portions 102 oppose the flexible conductors 44 in the front-rear direction. The bulging portions 102 bulge to the side opposite to the flexible conductors 44. The bulging portions 102 bulge rearward. That is, the bulging portions 102 are arranged above the first joint portions 52. The bulging portions 102 are arranged on the other side relative to the first joint portions 52. The bulging portions 102 are arranged below the second joint portions 48. That is, the bulging portions 102 are arranged on the one side relative to the second joint portions 48. The flexible conductors 44 can enter the bulging portions 102.

The bulging portions 102 overlap with the recesses 78 when viewed from the front-rear direction. That is, the bulging portions 102 overlap with the recesses 78 when viewed from a direction orthogonal to the first direction and the direction in which the pair of side walls 26, 26 oppose each other.

The bulging portions 102 are located on the side opposite to the recesses 78 with respect to the flexible conductors 44 when viewed from the left-right direction. The bulging portions 102 and the recesses 78 are located on both the front and rear sides of the flexible conductors 44. That is, the flexible conductors 44 are arranged between the bulging portions 102 and the recesses 78 when viewed from the direction in which the pair of side walls 26, 26 oppose each other.

The second engaging projections 108 engage with the second lid portion 68. The second engaging projections 108 are provided on the rear surface of the first lid portion 66. That is, the second engaging projections 108 are provided on the surface of the second lid portion 68 opposite to the surface thereof opposing the flexible conductors 44. The second engaging projections 108 are provided below the first lid portion 66. The second engaging projections 108 are arranged below the bulging portions 102. In this embodiment, two second engaging projections 108 are provided.

Figure 11:
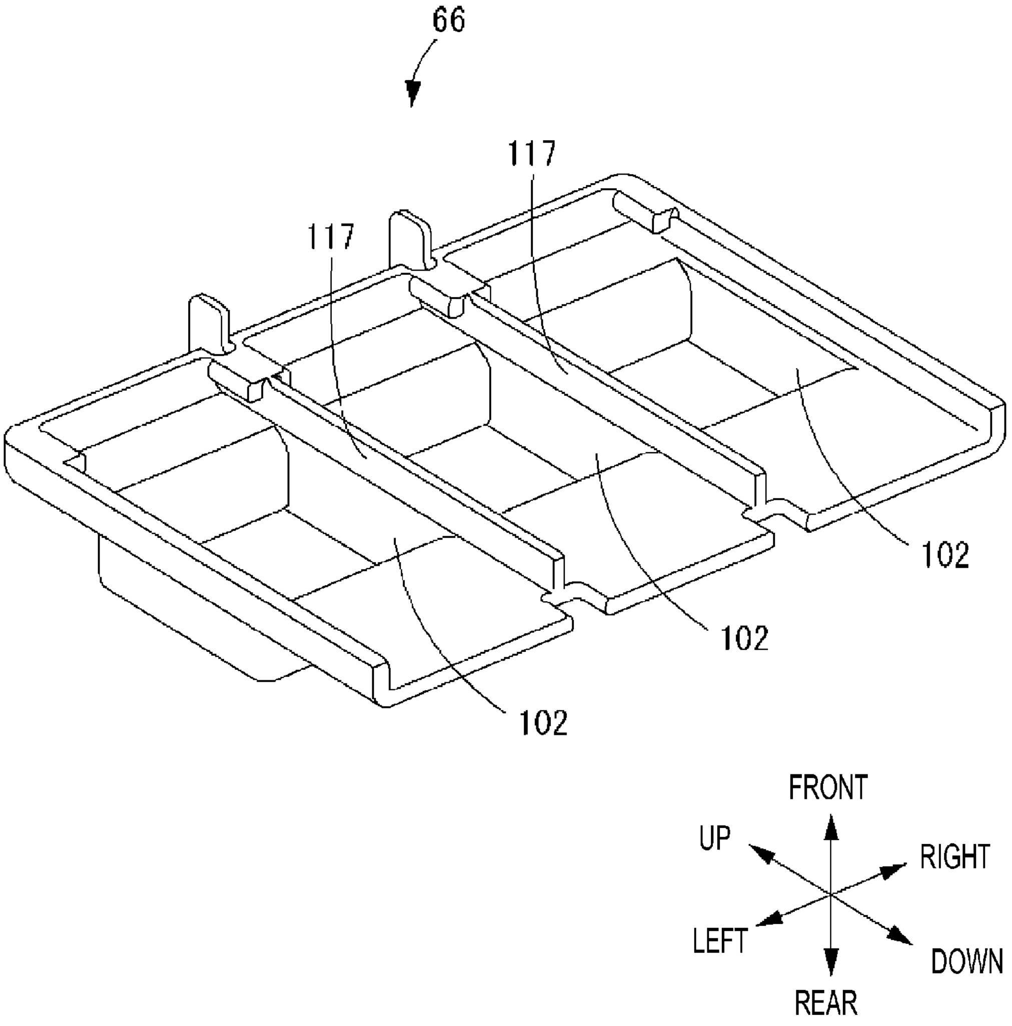
FIG. 11 is a perspective view of a first lid portion of the connector shown in FIG. 3.

As shown in FIG. 11, the guide protruding pieces 117 are provided on the front surface of the second lid portion 68. The guide protruding pieces 117 protrude frontward. The guide protruding pieces 117 extend along the up-down direction and are slidable along the guide rails 99. The guide protruding pieces 117 fit into the guide rails 99 of the main body portion 64. The guide protruding pieces 117 enable the first lid portion 66 to slide relative to the main body portion 64 along the guide rails 99. Two guide protruding pieces 117 are provided in this embodiment.

<Second Lid Portion 68>

As shown in FIGS. 2 and 7, the second lid portion 68 is attached to the main body portion 64 and the first lid portion 66. The second lid portion 68 is attached to the lower side of the main body portion 64. The second lid portion 68 is attached to the lower side of the first lid portion 66. The second lid portion 68 covers the second opening portions 77 of the main body portion 64. As shown in FIGS. 2, 3, 4, and 7, the second lid portion 68 has first engaging pieces 120 that engage with the main body portion 64, second engaging pieces 121 that engage with the first lid portion 66, and partner terminal insertion holes 122 that are open in the up-down direction.

The first engaging pieces 120 engage with the lower portion of the front wall 64A. The first engaging pieces 120 engage with the first engaging projections 84 of the front wall 64A. The second engaging pieces 121 engage with the lower portion of the first lid portion 66. The second engaging pieces 121 engage with the second engaging projections 108 of the first lid portion 66. The second engaging pieces 121 are arranged on the side opposite to the first engaging pieces 120. The second engaging pieces 121 are arranged below the bulging portions 102. The second engaging pieces 121 overlap with the bulging portions 102 when viewed from the up-down direction.

The partner terminal insertion holes 122 overlap with the second opening portions 77 of the main body portion 64. The partner terminal insertion holes 122 expose the terminal modules 14 to the outside of the second lid portion 68. The partner terminal insertion holes 122 expose the first terminals 22 of the terminal modules 14 to the outside of the second lid portion 68. The partner terminal insertion holes 122 allow the partner terminals 124 to enter from the lower side and allow the partner terminals 124 and the first terminals 22 to come into physical contact with each other. The partner terminal insertion holes 122 are provided so as to correspond to the number of the terminal modules 14 accommodated in the connector housing 16. In this embodiment, three partner terminal insertion holes 122 are provided.

<Partner Connector 12>

Figure 5:
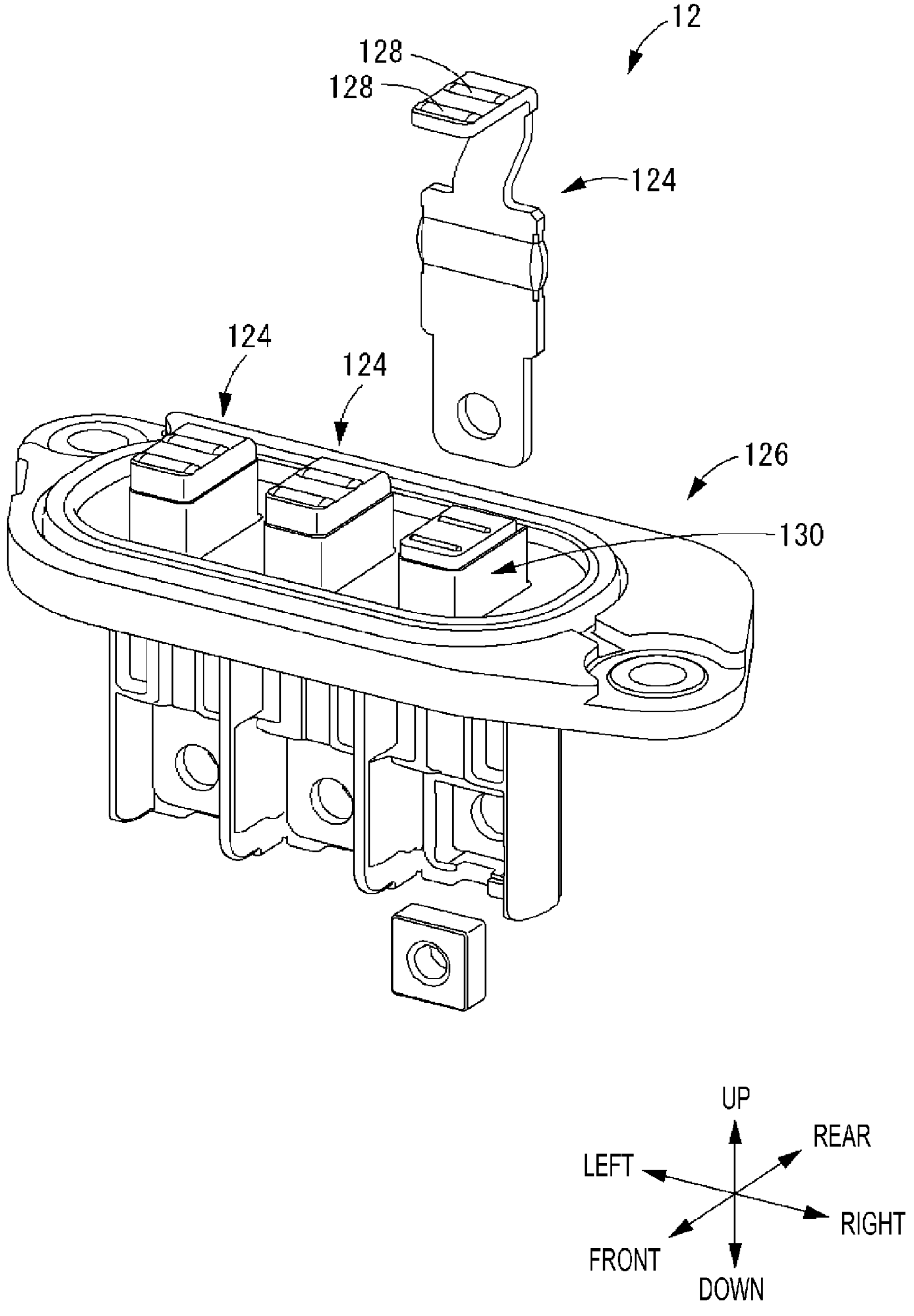
FIG. 5 is an exploded perspective view of the partner connector shown in FIG. 2.

The partner connector 12 has the partner terminals 124 and a partner housing 126, as shown in FIG. 5. The partner terminals 124 are held by the partner housing 126. At least part of each partner terminal 124 is embedded in the partner housing 126. The partner terminals 124 are provided through, for example, insert molding.

The partner terminals 124 are conductive metal members. The partner terminals 124 are made of a copper alloy, for example. The partner terminals 124 each include a region extending in the up-down direction and a region extending frontward from that region. The partner terminals 124 each have an L shape when viewed from the left-right direction. The partner terminals 124 each have partner contacts 128 that come into contact with the second surface 22B of the first portion 22*a* of the first terminal 22. The partner contacts 128 are provided in the form of beads on the upper surface of the partner terminal 124 by plastically deforming part of the partner terminal 124.

The partner housing 126 is a member made of resin. The partner housing 126 has fitting portions 130 that can enter the partner terminal insertion holes 122 of the connector housing 16. The fitting portions 130 have shapes that protrude upward. The fitting portions 130 support the partner terminals 124 on their upper surfaces.

<Fitting Between Connector 10 and Partner Connector 12>

The manner in which the partner connector 12 is fitted to the connector 10 will be described with reference to FIGS. 6, 7, 8, and 9. When the partner connector 12 moves upward and approaches the connector 10, the partner terminals 124 and the fitting portions 130 of the partner connector 12 pass through the partner terminal insertion holes 122 and enter the connector housing 16. Then, the partner contacts 128 of the partner terminals 124 come into contact with the second surfaces 22B of the first terminals 22. Note that when the partner connector 12 is fitted together with the connector 10, the connector 10 and the partner connector 12 need only relatively approach each other in the up-down direction, and the connector 10 may move downward to approach the partner connector 12.

When the partner connector 12 moves further upward after the partner contacts 128 comes into contact with the second surfaces 22B, the first terminals 22 are pressed by the partner contacts 128, whereby the first terminals 22 move upward while compressing the elastic members 18. At this time, the guided portions 62 of the first terminals 22 come into sliding contact with the guide surfaces 26B2 of the first leg portions 26B. Accordingly, the first terminals 22 move upward and move rearward by the amount that the guide surfaces 26B2 are inclined in the front-rear direction. Since the width of the guide surfaces 26B2 in the up-down direction is longer than the width by which the guide surfaces 26B2 are inclined in the front-rear direction, the amount of upward movement of the first terminals 22 during fitting is larger than the amount of rearward movement.

The second surfaces 22B of the first terminals 22 moving rearward slide in the front-rear direction on the partner contacts 128 moving upward. As a result, foreign matter adhering between the second surfaces 22B and the partner contacts 128 is removed. Examples of the foreign matter include films of sulfides, oxides, and the like formed on the surfaces of the second surfaces 22B.

Then, when the partner connector 12 moves further upward, the partner connector 12 is fitted to the connector 10. In this state, the first portions 22*a* of the first terminals 22 receive a downward biasing force from the elastic members 18 and an upward pressing force from the partner contacts 128. The first portions 22*a* of the first terminals 22 are sandwiched between the elastic members 18 and the partner contacts 128 in the up-down direction. Due to the first portions 22*a* being pressed against the partner contacts

128 by the elastic members 18 in this manner, the first terminals 22 can be more reliably electrically connected to the partner contacts 128.

As shown in FIGS. 6 and 7, after the connector 10 and the partner connector 12 are fitted together, the straight-line distance between the first joint portions 52 and the second joint portions 48 becomes shorter accompanying the upward movement of the first terminals 22. Accordingly, as the first terminals 22 move upward, the flexible conductors 44 are deformed, and the amount of bending of the flexible conductors 44 increases. Accordingly, the flexible conductors 44 tend to swing more easily after the connector 10 and the partner connector 12 are fitted together than before the connector 10 and the partner connector 12 are fitted together. That is, the flexible conductors 44 tend to swing more easily when the connector 10 and the partner connector 12 are fitted together than when the connector 10 and the partner connector 12 are not fitted together. The flexible conductors 44 can enter the bulging portions 102 when the connector 10 and the partner connector 12 are fitted together. The flexible conductors 44 can enter the recesses 78 when the connector 10 and the partner connector 12 are fitted together.

As shown in FIG. 6, when the connector 10 and the partner connector 12 are fitted together, the cases 20 are in contact with the contact surfaces 64D1. When the connector 10 and the partner connector 12 are fitted together, the ceiling walls 24 are in contact with the contact surfaces 64D1. When the connector 10 and the partner connector 12 are fitted together, the elastic members 18 bias the ceiling walls 24 toward the support wall 64D. When the connector 10 and the partner connector 12 are fitted together, the elastic members 18 press the ceiling walls 24 toward the support wall 64D. In the state where the connector 10 and the partner connector 12 are fitted together, the ceiling walls 24 are supported by the support wall 64D and the reinforcing member 64F.

The first terminals 22 are in contact with the partner contacts 128 when the connector 10 and the partner connector 12 are fitted together. The elastic members 18 bias the first terminals 22 toward the partner connector 12 when the connector 10 and the partner connector 12 are fitted together. The first terminals 22 are pressed toward the partner connector 12 when the connector 10 and the partner connector 12 are fitted together. The first terminals 22 are supported by the partner connector 12 when the connector 10 and the partner connector 12 are fitted together.

Next, the operations and effects of this embodiment will be described.

(1) The first lid portion 66 opposing the flexible conductors 44 has the bulging portions 102 that bulge toward the side opposite to the flexible conductors 44. Furthermore, the flexible conductors 44 can enter the bulging portions 102. Thus, the flexible conductors 44 can be inhibited from wearing due to coming into contact with the first lid portion 66, compared to the case where the first lid portion 66 is not provided with the bulging portions 102. Accordingly, durability of the connector 10 can be improved.

(2) When the connector 10 and the partner connector 12 are not fitted together, the bulging portions 102 are arranged on the other side relative to the first joint portions 52. The flexible conductors 44 can swing in the sections between the first joint portions 52 and the second joint portions 48. Due to the partner connector 12 and the connector 10 fitting together, the first terminals 22 move to the other side. That is, the swinging sections of the flexible conductors 44 in the first direction approach the other side. Thus, the swinging sections of the flexible conductors 44 in the first direction are shorter in the fitted-together state than in the non-fitted-together state. Accordingly, it is possible to suppress an excessive increase in the size of the connector 10 while suppressing wear of the flexible conductors 44, compared to the case where the bulging portions 102 overlap with the first joint portions 52 when viewed from a direction orthogonal to the first direction when the connector 10 and the partner connector 12 are not fitted together. Consequently, it is possible to achieve both an improvement in durability and suppression of an excessive increase in size of the connector 10.

(3) The bulging portions 102 are arranged on the one side relative to the second joint portions 48. The flexible conductors 44 can swing in the sections between the first joint portions 52, which are joint portions between the flexible conductors 44 and the first terminals 22, and the second joint portions 48, which are joint portions between the flexible conductors 44 and the second terminals 42. Furthermore, the first terminals 22 can move to the other side, while the second terminals 42 are held in the connector housing 16. Thus, it is possible to suppress an excessive increase in the size of the connector 10 while suppressing wear of the flexible conductors 44, compared to the case where the bulging portions 102 overlap with the second joint portions 48 when viewed from a direction orthogonal to the first direction. Accordingly, it is possible to achieve both an improvement in durability and suppression of an excessive increase in size of the connector 10.

(4) The opposing wall 79 opposing the flexible conductor 44 has the recess 78 that is recessed toward the side opposite to the flexible conductors 44. Furthermore, the flexible conductors 44 can enter the recess 78. Thus, the flexible conductors 44 can be inhibited from wearing due to coming into contact with the opposing wall 79, compared to the case where the opposing wall 79 is not provided with the recess 78. Accordingly, durability of the connector 10 can be improved.

(5) When the connector 10 and the partner connector 12 are not fitted together, the recess 78 is arranged on the other side relative to the first joint portions 52. The flexible conductors 44 can swing in the sections between the first joint portions 52, the flexible conductors 44, and the second joint portions 48. Due to the partner connector 12 and the connector 10 fitting together, the first terminals 22 move to the other side. That is, the swinging sections of the flexible conductors 44 in the first direction approach the other side. Thus, the swinging sections of the flexible conductors 44 in the first direction are shorter in the fitted-together state than in the non-fitted-together state. Accordingly, it is possible to suppress an excessive increase in the size of the connector 10 while suppressing wear of the flexible conductors 44, compared to the case where the recess 78 overlaps with the first joint portions 52 when viewed from a direction orthogonal to the first direction when the connector 10 and the partner connector 12 are not fitted together. Consequently, it is possible to achieve both an improvement in durability and suppression of an excessive increase in size of the connector 10.

(6) The recess 78 is arranged on the one side relative to the second joint portion 48. The flexible conductors 44 can swing in the sections between the first joint portions 52 and the second joint portions 48. Furthermore, the first terminals 22 can move to the other side, while the second terminals 42 are held in the connector housing 16. Thus, it is possible to make the connector 10 more compact while suppressing wear of the flexible conductors 44, compared to the case where the recess 78 overlaps with the second joint portions 48 when viewed from a direction orthogonal to the first direction. Accordingly, it is possible to achieve both an improvement in durability and suppression of an excessive increase in size of the connector 10.

(7) The recess 78 has the first inclined surface 78A that inclines toward the one side as it approaches the flexible conductors 44. Thus, it is possible to suppress wear of the flexible conductors 44 compared to the case where the first inclined surface 78A is not provided. Accordingly, durability of the connector 10 can be improved.

(8) The recess 78 has the second inclined surface 78B that inclines toward the other side as it approaches the flexible conductors 44. Thus, it is possible to suppress wear of the flexible conductors 44 compared to the case where the second inclined surface 78B is not provided. Accordingly, durability of the connector 10 can be improved.

(9) The bulging portions 102 overlap with the recess 78 when viewed from a direction orthogonal to the first direction and the direction in which the pair of side walls 26, 26 oppose each other. Thus, the connector housing 16 has a section in which the flexible conductor 44 can enter both the bulging portions 102 and the recess 78 in the first direction when the flexible conductors 44 swing. Accordingly, the flexible conductors 44 can be inhibited from wearing due to coming into contact with the connector housing 16. Consequently, durability of the connector 10 can be improved.

(10) The flexible conductors 44 are arranged between the bulging portions 102 and the recess 78 when viewed from the direction in which the pair of side walls 26, 26 oppose each other. The flexible conductors 44 are sandwiched between the bulging portions 102 and the recess 78. Thus, even if the flexible conductor 44 vibrates toward either the bulging portions 102 or the recess 78, the flexible conductors 44 can be prevented from wearing due to coming into contact with the connector housing 16. Accordingly, durability of the connector 10 can be improved.

Other Embodiments

The above embodiment can be implemented with the following modifications. The above embodiments and the following modified examples can be implemented in combination with each other as long as there are no technical discrepancies.

The number of terminal modules 14 in the above embodiment is not limited to three, and may be changed to two or less, or four or more.

The connector housing 16 of the above embodiment has the body portion 64, the first lid portion 66, and the second lid portion 68 in the above embodiment, but there is no limitation to this. The connector housing 16 need only be able to accommodate the terminal modules 14.

The elastic member 18 of the above embodiment may also be a member other than the coil spring as long as it is a member that can be stretched and contracted in the up-down direction. The elastic member 18 need not be made of stainless steel. The elastic member 18 may be, for example, a leaf spring or a rubber member.

The case 20 of the above embodiment need not be made of stainless steel. The case 20 may be made of, for example, an iron alloy, a copper alloy, or an aluminum alloy.

The first terminal 22 of the above embodiment need not be made of a copper alloy. The first terminal 22 may also be made of an aluminum alloy, for example.

The first terminal 22 of the above embodiment may also be plated. The first terminal 22 may be plated with copper tin, for example.

In the first terminal 22 of the above embodiment, the first portion 22*a* and the second portion 22*b* need not formed in one piece, and the second portion 22*b* may be omitted. If the second portion 22*b* is omitted, the second engaging portions 60 are provided on the first portion 22*a*. In this case, the flexible conductor 44 is joined to the first portion 22*a*.

The second terminal 42 of the above embodiment need not be made of a copper alloy. The second terminal 42 may also be made of an aluminum alloy, for example.

The second terminal 42 of the above embodiment may also be plated. The second terminal 42 may be plated with copper tin, for example.

The flexible conductor 44 of the above embodiment is not particularly limited as long as it is a flexible conductor. The flexible conductor 44 may also be, for example, a tubular braided wire, or a bare electric wire composed of conductive twisted wires. The flexible conductor 44 may also be, for example, a covered electric wire obtained by covering a conductive twisted wire with an insulator, or a laminated bus bar obtained by laminating conductive thin plates.

The first joint portion 52 of the above embodiment need only be joined to the first terminal 22, and is not limited to being joined through resistance welding. The first joint portion 52 may also be joined to the first terminal 22 through, for example, ultrasonic welding or crimping.

The second joint portion 48 in the above embodiment need only be joined to the second terminal 42, and is not limited to being joined through resistance welding. The second joint portion 48 may also be joined to the second terminal 42 through, for example, ultrasonic welding or crimping.

The reinforcing member 64F in the above embodiment may also be made of a material other than metal, as long as it has higher rigidity than the support wall 64D. The reinforcing member 64F may be made of, for example, a thermosetting resin or a thermoplastic resin.

The reinforcing member 64F in the above embodiment may also be omitted.

The foreign matter in the above embodiment is not limited to a film of a sulfide, an oxide, or the like formed on the surface of the second surface 22B. The foreign matter may also be, for example, a film of a sulfide, an oxide, or the like formed on the surface of the partner contact 128, dust adhering to the surface of the second surface 22B, or dust adhering to the surface of the partner contact 128.

The bulging portion 102 of the above embodiment may also include a portion arranged on the one side relative to the first joint portion 52 when not fitted together with the partner connector 12.

The bulging portion 102 of the above embodiment may also include a portion arranged on the other side relative to the second joint portion 48.
The recesses 78 of the above embodiment may also be omitted.
The recess 78 of the above embodiment may also include a portion arranged on the one side relative to the first joint portion 52 when fitted together with the partner connector 12.
The recess 78 of the above embodiment may also include a portion arranged on the other side relative to the second joint portion 48.
The first inclined surface 78A of the above embodiment may also be omitted.
The second inclined surface 78B of the above embodiment may also be omitted.
The bulging portions 102 of the above embodiment need not overlap with the recesses 78 when viewed from a direction orthogonal to the first direction and the direction in which the pair of side walls 26, 26 oppose each other.
The flexible conductors 44 of the above embodiment need not be arranged between the bulging portions 102 and the recesses 78 in the direction orthogonal to the first direction and the direction in which the pair of side walls 26, 26 oppose each other.
The embodiments disclosed herein are to be considered as exemplary in all respects and not restrictive. The scope of the present invention is indicated not by the above-described meaning, but by the scope of the claims, and all modifications within the meaning and range equivalent to the scope of the claims are intended to be encompassed therein.

LIST OF REFERENCE NUMERALS

10 Connector
12 Partner connector
14 Terminal module
16 Connector housing
18 Elastic member
18*a* First end portion
18*b* Second end portion
20 Case
22 First terminal
22*a* First portion
22*b* Second portion
22A First surface
22B Second surface
24 Ceiling wall
26 Side wall
26A Base portion
26B First leg portion
26B1 First receiving portion
26B2 Guide surface
26C Second leg portion
26C1 Second receiving portion
26C2 Lower end portion
26D Guide projection
27 Slit
28 Elastic member holding wall
42 Second terminal
42A Upper portion
42B Lower portion
42C Constricted portion
44 Flexible conductor
48 Second joint portion
52 First joint portion
53 Intermediate portion
58 First engaging portion
60 Second engaging portion
62 Guided portion
64 Main body portion
64A Front wall
64B Right wall
64C Left wall
64D Support wall
64D1 Contact surface
64D2 Reinforcing surface
64E Upper wall
64F Reinforcing member
64F1 Fixing portion
66 First lid portion
68 Second lid portion
70 Terminal module accommodating portion
71 Partition wall
72 Case accommodating portion
74 Flexible conductor accommodating portion
75 First opening portion
76 Guide groove
77 Second opening portion
78 Recess
78A First inclined surface
78B Second inclined surface
79 Opposing wall
82 Holding portion
84 First engaging projection
99 Guide rail
102 Bulging portion
108 Second engaging projection
117 Guide protruding piece
120 First engaging piece
121 Second engaging piece
122 Partner terminal insertion hole
124 Partner terminal
126 Partner housing
128 Partner contact
130 Fitting portion

What is claimed is:

1. A connector configured to fit together with a partner connector relatively approaching along a first direction extending from one side to another side, and configured to electrically connect to the partner connector, the connector comprising:
a terminal module configured to electrically connect to the partner connector; and
a connector housing accommodating the terminal module,
wherein the terminal module includes:
a case including a ceiling wall and a pair of side walls extending from the ceiling wall to the one side;
an elastic member that is accommodated in the case and is elastically deformable along the first direction;
a first terminal that is supported by the pair of side walls while being biased toward the one side by the elastic member, and is movable to the other side by being pressed by the partner connector;
a second terminal that is arranged on the other side relative to the first terminal and is held in the connector housing; and
a flexible conductor electrically connecting the first terminal and the second terminal to each other,
the flexible conductor has a first joint portion joined with the first terminal and a second joint portion joined with the second terminal, the connector housing includes:

a main body portion configured to hold the terminal module; and a first lid portion configured to be attached to the main body portion and oppose the flexible conductor, the first lid portion has a bulging portion that bulges toward a side opposite to the flexible conductor, and the flexible conductor is capable of entering the bulging portion when the connector is fitted together with the partner connector.

2. The connector according to claim 1, wherein when the connector and the partner connector are not fitted together, the bulging portion is arranged on the other side relative to the first joint portion.

3. The connector according to claim 1, wherein the bulging portion is arranged on the one side relative to the second joint portion.

4. The connector according to claim 1, wherein the main body portion of the connector housing has an opposing wall opposing the flexible conductor, the opposing wall has a recess recessed toward a side opposite to the flexible conductor, and the flexible conductor is capable of entering the recess when the connector and the partner connector are fitted together.

5. The connector according to claim 4, wherein when the connector and the partner connector are not fitted together, the recess is arranged on the other side relative to the first joint portion.

6. The connector according to claim 4, wherein the recess is arranged on the one side relative to the second joint portion.

7. The connector according to claim 4, wherein the recess has a first inclined surface that inclines toward the one side as it approaches the flexible conductor.

8. The connector according to claim 4, wherein the recess has a second inclined surface that inclines toward the other side as it approaches the flexible conductor.

9. The connector according to claim 4, wherein the bulging portion overlaps with the recess when viewed in a direction orthogonal to the first direction and a direction in which the pair of side walls oppose each other.

10. The connector according to claim 4, wherein the flexible conductor is arranged between the bulging portion and the recess when viewed from a direction orthogonal to the first direction and a direction in which the pair of side walls oppose each other.

* * * * *